(12) United States Patent
Kelsey et al.

(10) Patent No.: US 6,207,322 B1
(45) Date of Patent: Mar. 27, 2001

(54) ALKALINE CELL WITH SEMISOLID CATHODE

(75) Inventors: G. Stephen Kelsey, Nashua, NH (US); Purush Chalilpoyil, Lincoln; Philp D. Trainer, Medway, both of MA (US); Alex Kaplan, Providence, RI (US); George Cintra, Holliston, MA (US); Viet H. Vu, Medway, MA (US); John D. Sillesky, Franklin, MA (US)

(73) Assignee: Duracell Inc, Bethel, CT (US)

( * ) Notice: Subject to any disclaimer, the term of this patent is extended or adjusted under 35 U.S.C. 154(b) by 0 days.

(21) Appl. No.: 09/192,863

(22) Filed: Nov. 16, 1998

(51) Int. Cl.[7] .............................. H01M 4/50; H01M 4/24; H01M 4/30; H01M 6/04

(52) U.S. Cl. .................... 429/206; 429/224; 429/229; 29/623.1; 29/623.2

(58) Field of Search .................................. 429/206, 224, 429/229; 29/623.1, 623.2

(56) References Cited

U.S. PATENT DOCUMENTS

| | | | |
|---|---|---|---|
| 3,996,068 | * 12/1976 | Urry | 429/101 |
| 4,121,018 | 10/1978 | Kocherginsky et al. | 429/27 |
| 5,346,783 | * 9/1994 | Tomantschger et al. | 429/66 |
| 5,489,493 | 2/1996 | Urry | 429/224 |
| 5,501,924 | 3/1996 | Swierbut et al. | 429/224 |
| 5,674,639 | * 10/1997 | Urry | 429/122 |

FOREIGN PATENT DOCUMENTS

| | | |
|---|---|---|
| 2358752 | 2/1978 | (FR) . |
| 56-079854 | 6/1981 | (JP) . |
| 56-79854 | 6/1981 | (JP) . |
| 09180736 | 7/1997 | (JP) . |
| 9-180736 | 7/1997 | (JP) . |
| 9-180708 | * 7/1997 | (JP) . |
| WO9934461 | 7/1999 | (WO) . |

OTHER PUBLICATIONS

Weast, Robert C. ed. CRC Handbook of Chemistry and Physics, 63rd ed. CRC Press Inc., pp. B–89, B–118, and D–253, 1982.*

James Kriegsmann, "The Effect of Cathode Porosity on the Performance of a AA Size Alkaline Cell," M.S. Thesis, Columbia University, 1995 (Month N/A).

* cited by examiner

Primary Examiner—Stephen Kalafut
Assistant Examiner—Jonathan Crepeau
(74) Attorney, Agent, or Firm—Barry D. Josephs; Paul I. Douglas; Thomas G. Krivulka (57) ABSTRACT

An alkaline cell is disclosed having a cathode comprising manganese dioxide wherein the cathode is a semisolid during discharge of the cell. The cell has an anode comprising zinc and an electrolyte comprising potassium hydroxide. The semisolid cathode comprising manganese dioxide may be in the form of a putty or paste. The semisolid cathode reduces cathode polarization effects and results in increased manganese dioxide utilization (Amp-hr/g), particularly at high current drain, between about 0.5 and 2 Amp. The porosity of the cathode is between about 45% and 70%, and the volume ratio of electrolyte solution in the cathode to the solids in the cathode is at a value between about 0.7 and 2.3.

62 Claims, 5 Drawing Sheets

ALKALINE CELL WITH SEMISOLID CATHODE

FIELD OF THE INVENTION

The invention relates to alkaline cells having a cathode comprising manganese dioxide. The invention relates particularly to an alkaline cell having an anode comprising zinc, a cathode comprising manganese dioxide, and an electrolyte comprising potassium hydroxide wherein the cathode is a semisolid material.

BACKGROUND

The cell contents of a primary (non-rechargeable) alkaline cell typically contain an anode comprising zinc, alkaline electrolyte, a cathode comprising manganese dioxide, and an electrolyte permeable separator film between the anode and cathode. The alkaline electrolyte is typically an aqueous solution of potassium hydroxide, but other alkali solutions of sodium or lithium hydroxide may also be employed. The cell contents are typically housed in a cylindrical steel container. The anode material comprises zinc particles admixed with zinc oxide and conventional gelling agents, such as carboxymethylcellulose or acrylic acid copolymers, and electrolyte solution. The gelling agent holds the zinc particles in place and in contact with each other. The cathode material comprises manganese dioxide, and small amount of electrolyte and may also include small amounts of carbon or graphite to increase conductivity. The cathode material is a solid material compressed against the inside surface of the cell casing forming a hard compacted mass. An ion porous separator material, typically of cellulosic material, is placed over the inside surface of the cathode. The anode material is typically inserted into the core of the casing with the anode and cathode separated by the separator material. A conductive metal nail, known as the anode current collector, is typically inserted into the anode material and is in electrical contact with an end plate which forms the cell's negative terminal.

There is a growing need to make primary alkaline cells better suitable for high power application. Modern electronic devices such as cellular phones, digital cameras and toys, flash units, remote control toys, camcorders and high intensity lamps are examples of such high power applications. Such devices require high current drain rates of between about 0.5 and 2 Amp, typically between about 0.5 and 1.5 Amp. Correspondingly, they require operation at power demands between about 0.5 and 2 Watt.

Conventional alkaline cells have solid cathodes comprising particulate manganese dioxide. Electrolytic $MnO_2$ (EMD) is generally preferred because of its high density and since it is conveniently obtained at high purity by electrolytic methods. Other particulate $MnO_2$, for example, $MnO_2$ obtained by chemical methods referred to in the art as chemical $MnO_2$ (CMD) may also be used. Such chemical $MnO_2$ (CMD) is generally less dense than electrolytic $MnO_2$ (EMD). In conventional alkaline cell cathodes the manganese dioxide composition is high—between about 70 and 87 percent by weight. Conventional alkaline cell cathode may typically be composed of electrolytic manganese dioxide (80–87 wt %), graphite (7–10 wt %), and a 7–11 Normal "aqueous KOH solution" (5–7 wt %). Such mixtures form a moist solid mix which is fully compacted into the cell casing using plungers or other such compacting devices forming a compacted solid cathode mass. The cathode material may be preformed into the shape of pellets or rings which are inserted into the cell in stacked arrangement, for example, as shown in U.S. Pat. No. 5,283,139, and then recompacted. The resulting compacted cathode in either case is a hard, solid material.

U.S. Pat. No. 5,501,924 discloses such conventional solid cathodes comprising $MnO_2$ for alkaline cell. For example, this reference discloses a cathode for a D size alkaline cell wherein the cathode is preferably composed of 71.7 to 81.7 weight percent $MnO_2$, about 8.5 weight percent graphite, and about 7.9 weight percent alkaline solution, such as 45% KOH solution, and about 0.4 weight percent deionized water, and about 1.5 weight percent binder solution containing tetrafluoroethylene in water. The cathode also contains about 0.1 to 10 weight percent $SnO_2$ additive such that the combined weight percent of $MnO_2$ and $SnO_2$ is a constant of preferably about 81.8. (col. 2, lines 46 to 58). The reference discloses that such cathode material is placed into a steel can and molded into shape. The reference also discloses a cathode for AA size alkaline cell wherein the cathode is composed of 74.0 to 84.0 weight percent $MnO_2$, about 7.3 weight percent graphite, and about 7.2 weight percent alkaline solution, such as 45% KOH solution, and about 1.5 weight percent deionized water and about 0.1 to 10 weight percent $SnO_2$ additive such that the combined weight percent of the $MnO_2$ and the $SnO_2$ is preferably about 84.0. (col. 2, line 63 to col. 3, line 6) A person skilled in the art would recognize that the recited cathode material for either the D or AA cell would be a solid loosely packed mix of material even before it is placed in the cell because of the high solids content and low liquid content. Once molded in the cell this mass becomes even further compacted to form a compacted solid cathode mass because of the high level MnO2 and solids content in conjunction with the relatively low liquid content. Such mass has the property that it readily becomes compacted into a rigid solid structure upon application of compressive forces.

U.S. Pat. No. 5,489,493 discloses that the porosity of the cathode comprising $MnO_2$ for alkaline cells may be adjusted by admixing a high porosity manganese dioxide (CMD) with a low porosity manganese dioxide (EMD). The reference discloses that when the materials are combined in a homogeneous mixture the preferred average porosity of the cathode is 15% to 35% and more preferably 20% to 25%. (col. 4, lines 25–29.) The reference discloses that the cathode material typically comprises between bout 80 to 85 weight percent of the total cathode and that an amount of electrolyte solution is added sufficient to wet the dry components. The mix is molded or compressed against the container, or premolded as rings and the rings pressed into the container. (col. 5, lines 28–30) A person skilled in the art would recognize that the referenced cathode material molded or compressed against the container results in a compacted solid mass of material because the reference indicates that the cells had a high (73.2 volume percent) solid packing in the cathode (col. 2, line 57–59).

The strategy in formulating conventional alkaline cell cathode is to employ high concentration of manganese dioxide in the mix in order to achieve high capacity (amphrs). In high power application, that is, at high current drain, deleterious effects such as cathode polarization can occur. Polarization results from limited mobility of ions within the cathode active material and within the electrolyte, which in turn reduces service life. The phenomenon of cathode polarization may be caused by the accumulation of hydroxide ions in the cathode during high rate discharge. The accumulation of hydroxide ions in the cathode prevents these ions from reaching the anode where they are required to sustain the oxidation of zinc, that is, to react with zinc ions to form zinc oxide by-product. In conventional solid $MnO_2$ cathodes the polarization effect may be so serious at high current drain, for example, between about 1 and 1.5 Amp drain that only 20% or less of the cell's theoretical capacity (Amp-hr) may be obtainable. Thus, it is desirable to provide a way of reliably increasing the manganese dioxide utilization (actual specific capacity of the manganese dioxide, Amp-hr/g) at high drain without adversely affecting cell performance.

Also, conventional $MnO_2$ cathodes for alkaline cells, because they are solid material, have the disadvantage that they are susceptible to breakage during compaction or accidental cell impact after the cathodes have been compacted into the cell. Also, tools are required to compact the solid cathodes into the cell. These tools need to be replaced frequently because of wear as they are constantly applied against the hard solid cathode during mass production cell assembly.

Thus, it is desirable to avoid cathode breakage and the need for replacement tools to compact the cathode in the cell.

SUMMARY OF THE INVENTION

In one aspect the invention is directed to an alkaline cell, particularly to a primary (non-rechargeable) alkaline cell having an anode comprising zinc and a cathode comprising manganese dioxide wherein the improvement resides in the cathode being in a semisolid state when the cell is fresh and preferably throughout the cell's useful service life.

The utilization of $MnO_2$ (actual specific capacity, mAmp-hr/g) in the semisolid cathode of the invention can be much higher than with conventional compacted solid $MnO_2$ cathodes, particularly under high current drain (0.5 to 2.0 Amp drain). Thus, the actual cell capacity (mAmp-hrs) of hermetically sealed alkaline cells employing the semisolid $MnO_2$ cathode can be greater than that achieved in conventional alkaline cells employing compacted solid $MnO_2$ cathodes. Typically the percent utilization of $MnO_2$ in alkaline cells employing the conventional solid cathodes when discharged to 0.8Volts at 1 Amp is about 30%. By contrast the percent utilization of $MnO_2$ in alkaline cells employing the semisolid cathode of the invention discharged to 0.8Volts at 1 Amp may be between about 40 and 70%. (Based on theoretical 100% utilization of $MnO_2$ at 308 mAmp-hr/g.)

In another aspect the alkaline cells employing the cathode of the invention may exhibit an energy density of between about 0.10 and 0.30, more typically between about 0.12 and 0.25 Watt-hrs per gram $MnO_2$ when the cell is drained at 1 Amp to a cut off voltage of about 0.8Volts, whereas the energy density of the same cell discharged at the same rate but employing conventional solid cathode may be about 0.1 Watt-hrs per gram $MnO_2$.

In another aspect of the invention the semisolid cathode in the alkaline cell comprises manganese dioxide in amount which is less than 80 percent by weight of the cathode and preferably between about 40 and 80 percent by weight, typically between about 45 and 78, more typically between about 45 and 70 percent by weight of the cathode.

In one aspect of the invention the semisolid cathode comprising manganese dioxide may be in the form of a putty or paste or a highly viscous material having a measurable viscosity.

In another aspect the semisolid cathode of the invention comprises manganese dioxide and also carbon in the form of acetylene black. Advantageously, the acetylene black preferably comprises between about 5 and 15 percent by weight of the semisolid cathode. Desirably the semisolid cathode of the invention also comprises electrolyte solution comprising potassium hydroxide. The semisolid cathode may also comprise a binder such as polytetrafluroethylene, desirably comprising between about 0 and 2 percent by weight of the cathode. The acetylene black increases the conductivity of the semisolid cathode and provides an internal network to maintain the cathode in a semisolid state.

In another aspect the semis solid cathode material of the invention may have an porosity between about 30 and 70%, preferably between about 35 and 70%, more preferably between about 40 and 70%. The semisolid cathode material of the invention may desirably also have a higher electrolyte content as a weight percent of total cathode than conventionally employed in solid $MnO_2$ containing cathodes for alkaline cells. The semisolid cathode material of the invention desirably may have a KOH content (pure) of between about 6 and 18 percent by weight of total cathode material and a total water content between about 9 and 27 percent by weight. The term KOH (pure) as used herein and in the examples with respect to KOH is the pure KOH content (i.e., without water) for calculation purposes. By contrast a conventional alkaline cell solid cathode may contain 2.7 percent by weight KOH (pure) and a total water content of about 4.3 percent by weight.

In another aspect the cathode material of the invention in the cell may have a volume ratio of electrolyte solution (including any additional water separately added the cathode mix) to the total solids of between about 0.4 and 2.3, preferably between about 0.7 and 2.3. The semisolid cathode advantageously comprises between about 15 and 45 percent by weight electrolyte solution (including any additional water separately added at any time to the cathode), preferably between about 20 and 45 percent by weight. The electrolyte solution may be an aqueous KOH solution desirably having a KOH concentration of between about 30 wt % and 51 wt % (including any additional water separately added at any time to the cathode).

In another aspect the aqueous electrolyte content in the cathode of the invention may comprise between about 15 and 45 percent by weight of said cathode and said aqueous electrolyte (including any additional water separately added to the cathode) has a potassium hydroxide concentration of between about 30 and 51 percent by weight.

BRIEF DESCRIPTION OF THE DRAWINGS

The invention will be better understood with reference to the drawings in which.

DETAILED DESCRIPTION

It has been determined that the specific capacity (Amp-hr/g) of manganese dioxide which is used as active material in the cathode of an alkaline cell, particularly a primary (non-rechargeable) sealed alkaline cell, can be markedly increased if the cathode in the cell is a semisolid before the cell is discharged and preferably remains as a semisolid as the cell is discharged. The increase in specific capacity of the manganese dioxide, resulting in more effective utilization of the manganese dioxide in the semisolid cathode, is especially noticeable during cell discharge at high current drain, for example, between about 0.5 and 2 Amp, typically between about 0.5 and 1.5 Amp. This corresponds to a applications which have an average power demand between about 0.5 and 2 Watt, typically between about 0.5 and 1.5 Watt. The higher $MnO_2$ utilization is also reflected by higher energy density (Watt-hrs per gram $MnO_2$) resulting from use of the cathode of the invention in sealed alkaline cells applied to high drain applications, e.g., at 0.5 to 2.0 Amp drain.

The increase in specific capacity of the $MnO_2$ in the semisolid cathode is obtainable irrespective of whether the manganese dioxide in the cathode is chemical manganese dioxide (CMD) or electrolytic manganese dioxide (EMD) or mixtures thereof.

The semisolid cathode of the invention can be expected to provide higher $MnO_2$ utilization, (higher actual specific capacity of $MnO_2$, Amp-hr/g) at high current drain (high power application) than obtained with conventional solid $MnO_2$ cathodes even if the porosity of the two cathodes are the same. Therefore, porosity is not controlling of $MnO_2$ utilization in high power application, rather the semisolid state of the cathode is believed to be the major factor leading to increased $MnO_2$ utilization in high power application (0.5 to 2 Amp drain). It is conjectured that the semisolid cathode gives better utilization of $MnO_2$ at high current drain primarily because the semisolid material provides for greater uniformity of pore and electrolyte distribution. The semisolid also allows for better mass transport at high current drain. Additionally the semisolid state allows for attainment of higher porosity cathodes, e.g. between about 40 and 70%, and higher electrolyte loading as a percent by weight and volume of the cathode than can be obtained with conventional solid mass cathodes. Thus, to the extent that increased porosity may be a contributing factor in attaining higher $MnO_2$ utilization at high current drain, the semisolid state allows for the attainment of such increased porosity.

DEFINITION

The term semisolid as used herein is intended to broadly cover all physical states which are intermediate in property between true solid and true liquid. Thus, the term semisolid is intended to include (for example, but not by way of any limitation) physical states having the soft texture and rheological properties commonly associated with putties and pastes. The semisolid material as used herein includes (for example, but not by way of any limitation) materials that are not free flowing as is a liquid but generally requires an external force in order to cause the material to move through a conduit. The term semisolid is also intended (for example, but not by way of any limitation) to apply to materials which are extrudable and which can be deformed without fracturing upon exertion of external pressure. The term semisolid as used herein (for example, but not by way of any limitation) is also intended to include highly viscous substances which may slowly ooze through a conduit when placed in vertical position. In this regard the term semisolid is intended to include such highly viscous material, for example, at least as viscous as molasses and having a measurable kinematic viscosity at 20° C.

In the semisolid cathode of the invention the $MnO_2$ content as a percent by weight or percent by volume of the cathode may characteristically be less than that achieved with conventional compacted solid cathodes containing $MnO_2$. For example, with conventional compacted solid $MnO_2$ containing cathodes for alkaline cells the $MnO_2$ content is typically between about 80 to 87 percent by weight. When the cathode is formulated so that it is in a semisolid state in accordance with the invention, the content of $MnO_2$ may be reduced, for example, to a level desirably less than about 80 percent by weight of the total cathode. The $MnO_2$ content in the semisolid cathode of the invention may desirably be between about 40 and 80 percent by weight, desirably between about 45 and 78 percent by weight, typically between about 45 and 70 percent by weight.

Since the total amount of $MnO_2$ in the semisolid cathode is typically less than a conventional compacted solid cathode for the same size cell, the theoretical capacity (Amp-hrs) of the semisolid cathode will be less than the theoretical capacity of the conventional compacted solid $MnO_2$ cathode. However, during high current drain (between about 0.5 and 2 Amp) a greater percent of the $MnO_2$ in the semisolid cathode will actually be reduced (discharged) to the normal discharge by-product MnO(OH) than in the conventional compacted cathode. That is, cathode polarization is reduced and the $MnO_2$ material in the semisolid cathode is better utilized, thus resulting in a higher specific capacity of $MnO_2$ (Amp-hr/g) in the semisolid cathode than in conventional compacted solid cathodes. For example, at high current drain of about 1 Amp the actual specific capacity of $MnO_2$ in a conventional Zn/MnO$_2$ alkaline cell employing compacted solid cathode comprising between about 80 to 87 percent by weight MnO$_2$ may only be about 96 mAmp-hr/g. Since the theoretical capacity of MnO$_2$ (EMD) in an alkaline cell is about 308 mAmp-hr per gram MnO$_2$ (reduction of MnO$_2$ to MnO(OH)), the actual utilization of MnO$_2$ at 1 Amp drain in the conventional cell is only about 31%. However, in the same alkaline cell employing the semisolid MnO$_2$ cathode of the invention the actual MnO$_2$ specific capacity at 1 Amp drain may be about 195 mAmp-hr/g, resulting in a MnO$_2$ utilization of about 63%. Thus, the semisolid cathode of the invention surprisingly reduces the level of deleterious polarization effects and results in much higher actual utilization of MnO$_2$. The higher utilization of MnO$_2$ in the semisolid cathode of the invention also results in a less expensive cell, since less MnO$_2$ active material need be supplied to the cell to achieve the same or better overall actual capacity for high power application. The percent utilization of MnO$_2$ in alkaline cells employing the semisolid cathode of the invention discharged to 0.8 Volts at 1 Amp may typically be between about 40 and 70%, more typically between about 44 and 68%. (Based on theoretical 100% utilization of MnO$_2$ at 308 mAmp-hr/g.) This represents a considerable improvement over the representative conventional cell (cathode formulation A) which had a percent MnO$_2$ utilization of 31% when the cell was discharged to 0.8 Volts at 1 Amp.

Because of the higher MnO$_2$ utilization the cells employing the cathode of the invention also exhibit a high energy density between, for example, about 0.14 and 0.30 Watt-hrs per gram MnO$_2$ when the cell is drained at 1 Amp to a cut off voltage of about 0.8 Volts, whereas the energy density of the same cell discharged at the same rate but employing conventional solid cathode may be about 0.1 Watt-hrs per gram MnO$_2$.

It has been determined that the semisolid cathode material of the invention may desirably also have a higher KOH content (measured as pure KOH, that is, without water, in weight percent of total cathode) than conventionally employed in solid MnO$_2$ containing cathodes for alkaline cells. The semisolid cathode material of the invention desirably may have a KOH content (pure) of between about 6 and 18 percent by weight of total cathode material. The total water content of the semisolid cathode may desirably be between about 9 and 27 percent by weight during cell discharge. The porosity of the semisolid cathode material of the invention may desirably be between about 30% and 70%, desirably between about 35% and 70%, preferably between about 40% and 70%, for example, between about 45 and 70%.

The cathode porosity may be calculated by determining the volume occupied by electrolyte, other liquids and entrapped air (including volume of liquid and air entrapped within the micropores of solids) and dividing that volume by the apparent volume of the cathode and multiplying by 100. (The apparent volume is the overall volume of a sample as contained within the external boundary of the sample.) The cathode porosity may be conveniently calculated by first obtaining the real density of each of the solids by conventional helium replacement method, before the solids are mixed into the cathode. (The real density of each solid is the solid sample weight divided by its real volume, that is, the solids sample apparent volume reduced by the volume occupied by entrapped air.) The respective weight of solids to be mixed into the cathode is then divided by their respective real densities to obtain the real volume of the solids in the cathode. The real volume of the solids is subtracted from the apparent volume of the cathode as a whole and this difference is divided by the cathode apparent volume×100 to yield porosity, percent. In essence the porosity of the cathode is the percent of the apparent volume of the cathode which is occupied by everything therein (liquids and entrapped air) except solids. The porosity of the cathode formulations presented and discussed herein including comparative formulation A were determined in the above manner.

The same cathode porosity (%) may also be determined by calculating the difference between the cathode solids real density and the cathode solids apparent density in the cathode and dividing the difference by the solids real density and multiplying by 100. The solids real density is the cathode sample weight excluding electrolyte and any other liquid present and any entrapped air and the sample volume reduced by the volume occupied by electrolyte, liquid and entrapped air. The cathode solids apparent density is the cathode sample weight excluding electrolyte and other liquid and entrapped air, but sample overall volume with electrolyte, other liquid and entrapped air therein. This calculation will give the porosity, that is, the percent of the apparent volume of the sample which is occupied by electrolyte, other liquid and entrapped air, as above.

The semisolid cathode material of the invention may have a volume ratio of electrolyte solution (including any additional water separately added) to the total solids of between about 0.4 and 2.3, preferably between about 0.5 and 2.3, more preferably between about 0.7 and 2.3. The volume ratios of said components are after they have been admixed to form the cathode mixture. The semisolid cathode advantageously comprises between about 15 and 45 percent by weight electrolyte solution (including any additional water separately added), preferably between about 20 and 45 percent by weight. The electrolyte solution may be an aqueous KOH solution desirably having a KOH concentration of between about 30 wt % and 51 wt % (including any additional water separately added the cathode mix).

Figure 1:
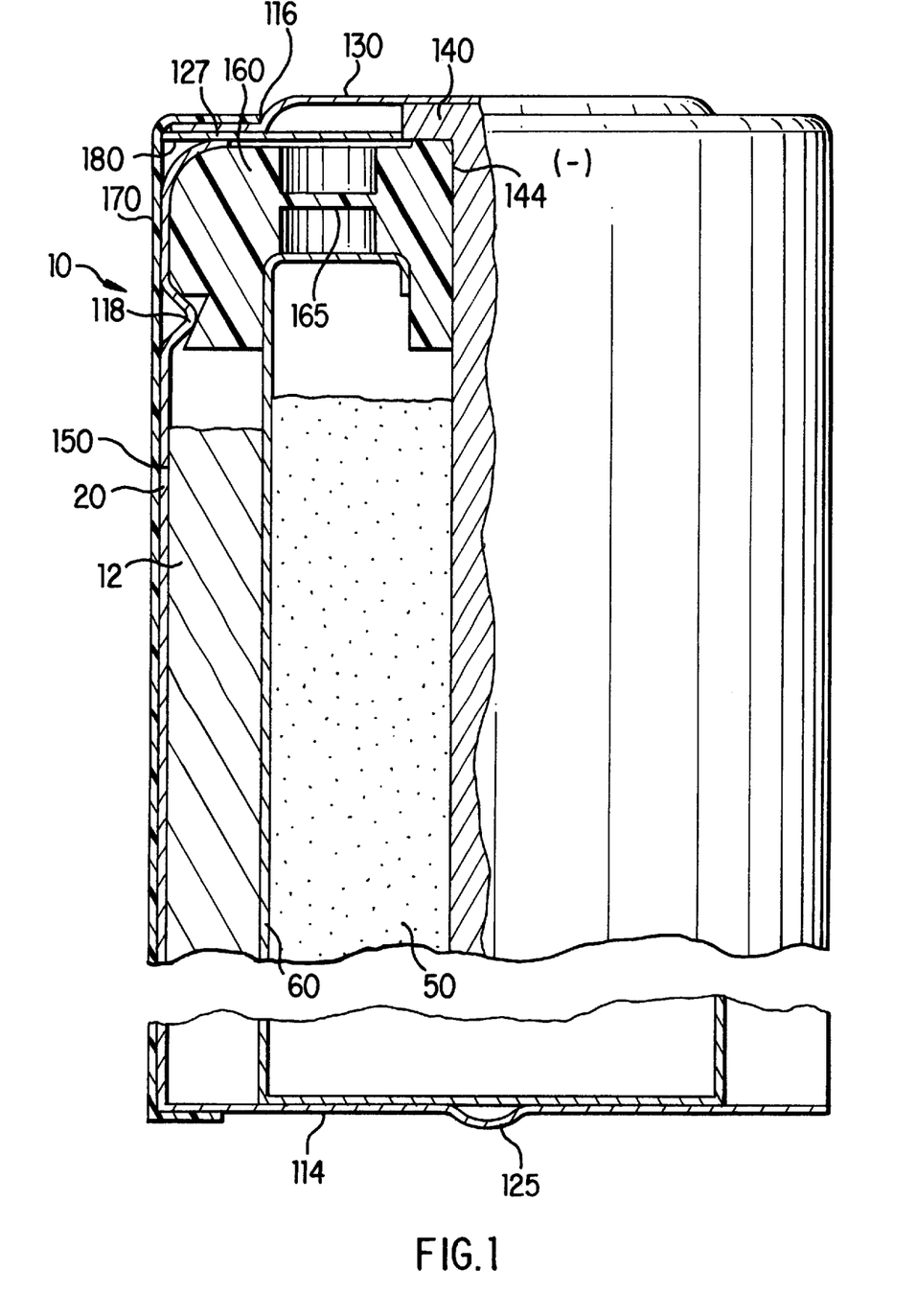
FIG. 1 is a cross sectional cut away view of an alkaline cell having a casing with inside surface contacting the cathode material of the invention.

A representative cell 10 employing the semisolid MnO$_2$ cathode 12 of the invention is shown in FIG. 1. The cell depicted in FIG. 1 is an AAA or AA size alkaline cell. However, the cell chemistry employing the semisolid cathode material of the invention is not intended to be restricted to any particular size cell. The cathode material of the invention, for example, may be employed in AAAA, AAA, AA, C and D size alkaline cells. Thus cell 10 may contain conventional alkaline cell anode chemistries including those which contain zero added mercury (less than 50 parts mercury per million parts total cell weight, preferably less than 10 parts mercury per million parts total cell weight) and modifications thereof. Such representative anode chemistries, for example, are disclosed in U.S. Pat. No. 5,401,590, herein incorporated by reference.

The zinc/MnO$_2$ cell 10 may represent a conventional primary alkaline cell manufactured in conventional manner, except for the MnO$_2$ cathode 12. The representative alkaline cell 10 may employ a conventional anode 50 comprising particulate zinc, conventional potassium hydroxide electrolyte and conventional separator. It is preferred that the zinc anode has no "added mercury". Zero-added mercury cells contain no added amounts of mercury, but may contain only the residual amount of mercury present in commercially available pure zinc, including the residual amount of mercury, if any, present in the other cell components. The total mercury content in such cells is less than 50 parts mercury per million parts total cell weight, typically less than 10 parts mercury per million parts total cell weight. However, the present invention is also applicable to zinc/

MnO₂ primary alkaline cells containing mercury. All the components in the cell including the anode active material, electrolyte and separator, except for cathode 12, may be composed of materials conventionally employed in such cells. Cathode 12 comprises the semisolid cathode material of the invention. Cathode 12 is a semisolid, which may typically have the consistency of a putty or paste, for example, the consistency of a sealing putty or adhesive paste. Cathode 12 of the invention could also have the flow properties of a highly viscous material such as molasses, having a measurable viscosity, for example, having a kinematic viscosity of at least 100 centistokes. Cathode 12 desirably comprises less than about 80 percent by weight $MnO_2$, for example, between about 40 and 80, typically between about 45 and 78 percent by weight $MnO_2$, more typically between about 45 and 70 percent by weight $MnO_2$. In the representative alkaline cell 10 the anode material 50 forms the central core of the cell and the cathode material 12 is located around the anode material with the separator 60 therebetween. The cathode material contacts the inside surface of the cell casing which is typically of nickel plated steel or stainless steel.

AA size alkaline cells 10 were prepared with the same conventional gelled zinc anode composition, separator and KOH electrolyte. The following cathode semisolid paste formulations were made and used as cathode material in the alkaline cell. A same size AA cell was prepared but conventional compacted solid $MnO_2$ cathode was employed (formulation A) as cathode material instead of the semisolid paste. The cells were discharged at 1 Amp continuous rate to 0.8V cut off and the actual specific capacity (utilization) of the MnO2 in the cells were determined. The results are presented in Table 1.

Formulation A (Conventional Compacted Solid Cathode)

|  | Wt % | Vol % |
|---|---|---|
| MnO2 (EMD) | 86.0 | 65.2 |
| graphite | 7.0 | 10.8 |
| entrapped air | negligible | 6.5 |
| electrolyte: | 7.0 | 17.5 |
| 38 wt % KOH (9 Normal) | | |
|  | 100.0 | 100.0 |

Porosity: 24 percent.
Ratio of Vol % Electrolyte to Vol % Total Solids: 0.23
Note: KOH (pure) 2.7 wt %; total $H_2O$ content 4.3 wt %.

Formulation 1 (Semisolid Cathode Putty/Paste)

|  | Wt % | Vol. % |
|---|---|---|
| MnO₂ (EMD) | 48.44 | 22.6 |
| Carbon Black (Shawinigan Acetylene Black) | 8.94 | 9.6 |
| Polytetrafluorethylene (PTFE TE5211) | 0.17 | 0.2 |
| Clay (Laponite RDS) | 0.42 | 0.9 |
| Water | 3.80 | 7.9 |
| Electrolyte: | 38.23 | 58.8 |
| 38 wt % KOH (9 Normal) | | |
|  | 100.0 | 100.0 |

Porosity: 66.7 percent.
Ratio of Vol % Electrolyte (including 7.9 vol % added water) to Vol % Total Solids: 2.00
Note: KOH (pure) 14.5 wt %; total $H_2O$ content 23.7 wt %.

Formulation 2 (Semisolid Cathode Putty/Paste)

|  | Wt % | Vol % |
|---|---|---|
| MnO₂ (EMD) | 50.7 | 24.9 |
| Carbon Black (Shawinigan Acetylene Black) | 9.3 | 10.5 |
| Electrolyte: | 40.0 | 64.6 |
| 38 wt % KOH (9 Normal) | | |
|  | 100.0 | 100.0 |

Porosity: 64.6 percent.
Ratio of Vol % Electrolyte to Vol % Total Solids: 1.82
Note: KOH (pure) 15.2 wt %; total $H_2O$ content 24.8 wt %.

Formulation 3 (Semisolid Cathode Putty/Paste)

|  | Wt % | Vol % |
|---|---|---|
| MnO₂ (EMD) | 56.1 | 28.9 |
| Carbon Black (Shawinigan Acetylene Black) | 6.8 | 8.0 |
| Electrolyte: | 37.1 | 63.1 |
| 38 wt % KOH (9 Normal) | | |
|  | 100.0 | 100.0 |

Porosity: 63.1 percent.
Ratio of Vol % Electrolyte to Vol % Total Solids: 1.71
Note: KOH (pure) 14.1 wt %; total $H_2O$ content 23.0 wt %.

Formulation 4 (Semisolid Cathode Putty/Paste)

|  | Wt % | Vol % |
|---|---|---|
| MnO₂ (EMD) | 52.3 | 26.3 |
| Carbon Black (Shawinigan Acetylene Black) | 10.6 | 12.3 |
| Electrolyte: | 37.1 | 61.4 |
| 38 wt % KOH (9 Normal) | | |
|  | 100.0 | 100.0 |

Porosity: 61.4 percent.
Ratio of Vol % Electrolyte to Vol % Total Solids: 1.59
Note: KOH (pure) 14.1 wt %; total $H_2O$ content 23.0 wt %.

Formulation 5 (Semisolid Cathode Putty/Paste)

|  | Wt % | Vol. % |
|---|---|---|
| MnO₂ (EMD) | 69.4 | 42.0 |
| Carbon Black (Shawinigan Acetylene Black) | 5.2 | 7.2 |
| Graphite | 2.6 | 3.2 |

-continued

|  | Wt % | Vol. % |
|---|---|---|
| Polytetrafluoroethylene (PTFE T30) | 0.4 | 0.5 |
| Electrolyte: | 22.4 | 47.1 |
| 30 wt % KOH |  |  |
|  | 100.0 | 100.0 |

Porosity: 47.1 percent.
Ratio of Vol % Electrolyte to Vol % Total Solids: 0.89
Note: KOH (pure) 6.7 wt %; total $H_2O$ content 15.7 wt %.

Formulation 6 (Semisolid Cathode Putty/Paste)

|  | Wt % | Vol % |
|---|---|---|
| $MnO_2$ (EMD) | 73.0 | 49.2 |
| Carbon Black (Shawinigan Acetylene Black) | 7.0 | 10.8 |
| Electrolyte: | 20.0 | 40.0 |
| (50 wt % KOH solution) |  |  |
|  | 100.0 | 100.0 |

Porosity: 40.0 percent.
Ratio of Vol % Electrolyte to Vol % Total Solids: 0.67
Note: KOH (pure) 10.0 wt %; total $H_2O$ content 10.0 wt %.
General Notes:
1. Laponite RDS Clay from Southern Clay Products Company PTFE T30 and TE5211 are aqueous suspensions of TEFLON resin (40 to 60% concentration) from E.I. Dupont de Nemours & Co.
2. Vol % of solids based on solids real density.
3. Real densities: $MnO_2$ (EMD)=4.48 g/cc; graphite=2.2 g/cc; Shawinigan acetylene black=1.95 g/cc; PTFE=2.1 g/cc; Laponite clay=1.0 g/cc; KOH electrolyte (38 wt %)=1.36 g/cc; KOH electrolyte (50 wt %)=1.51 g/cc; KOH electrolyte (30 wt %)=1.29 g/cc.
4. The porosity of the above semisolid cathode formulations 1–5 of the invention were essentially equal to the vol % of liquids in the cathode, since the volume contribution of entrapped air in the semisolid cathode is negligible. The porosity of the solid cathode of comparative formulation A was higher than the vol% of liquids in the cathode because of the entrapped air within the solid cathode.

The above formulation A was prepared by first mixing the particulate $MnO_2$ and graphite in a V shaped blender for about 10 minutes or until a homogenous mixture was obtained. The KOH electrolyte solution was then added and mixing continued for about another 5 minutes until a homogenous mixture obtained. When formulation A is compacted into a cell it forms a hard compacted solid mass. Such solid mass cannot be penetrated at 20° C. by tapping of a nail (1/16 inch diameter) at a 90° contact angle formed between the central longitudinal axis of the nail and the surface of the mass, without shattering the mass. Generally, conventional solid cathodes comprising $MnO_2$ physically fail, e.g., fracture or shatter, if a 1/16 inch diameter nail as above described is tapped into the mass of such cathodes.

The formulations 2,3, 4, and 6 were prepared in a similar manner by first mixing the particulate $MnO_2$ and carbon black in a V shaped blender for about 10 minutes or until a homogenous mixture was obtained. The KOH electrolyte solution was then added and mixing continued for about another 5 minutes until a homogenous mixture was obtained. The resulting mixture formulations 2, 3, and 4 had the consistency of a putty or paste. Mixture formulations 2, 3, and 4 were thus soft to the touch and a sample of each could be readily penetrated at a temperature of 20° C. by tapping of a nail (1/16 inch diameter) at a 90° contact angle formed between the central longitudinal axis of the nail and the surface of the mixture, without shattering the mixture. The term "shattering" as used herein is intended to be the equivalent of "fracturing". Such "nail" test as used herein is used to illustrate a typical physical property of the cathode of the invention and the term "semisolid" as given in the above definition is not intended to be limited to or by such test. The consistency does not noticeably change when the mixture formulations 2,3, and 4 are injected into the cell to form the cell's cathode. Mixture formulation 6 had a higher concentration of $MnO_2$ and upon mixing formed a moist pasty powder mix. This mix may be injected (extruded) under pressure into the cell casing whereupon it forms a semisolid having the consistency of a soft putty. The soft putty is readily penetrated at a temperature of 20° C. by tapping of a nail (1/16 inch diameter) at a 90° contact angle formed between the central longitudinal axis of the nail and the surface of the putty, without shattering the putty.

The formulations 1 and 5 were prepared in the same manner as above described except that the additional components Laponite RDS (formulation 1) was made ahead as a 10% solution. That is, a solution of 10 wt % Laponite RDS in water was prepared and this solution was added to the blend along with the electrolyte and the mixture blended for additional time if needed (at about 40 rpm) to obtain a homogenous putty or paste. (The above compositions separate the water content from the Laponite RDS). In the case of formulation 1 and 5 polytetrafluoroethylene (PTFE TE5211 or T30) was also added to the blend along with electrolyte and the mixture blended for additional time (about 10 minutes at 40 rpm) until a homogenous semisolid mixture was obtained. Mixture formulation 1 was putty or paste-like in consistency. It was soft to the touch and a sample of each could be readily penetrated at a temperature of 20° C. by tapping of a nail (1/16 inch diameter) at a 90° contact angle formed between the central longitudinal axis of the nail and the surface of the sample, without shattering the sample. The consistency does not noticeably change when the mixture formulation 1 is injected into the cell to from the cell's cathode. Mixture formulations 5 had a higher concentration of MnO2 and less liquid and upon mixing formed a moist pasty powder mix. This mix may be injected (extruded) under pressure into the cell casing whereupon it forms a semisolid having the consistency of a soft putty. The soft putty is readily penetrated at a temperature of 20° C. by tapping of a nail (1/16 inch diameter) at a 90° contact angle formed between the central longitudinal axis of the nail and the surface of the putty, without shattering the putty.

The same AA size test cells were prepared with each cell having a cathode composition corresponding to the above formulations. The cell components in each case were otherwise the same, including essentially the same anode, separator, current collector and KOH electrolyte, all of which cell components (except for the semisolid cathode paste of the invention) being conventionally employed in commercial alkaline cells. The anode material in each case had the formulation: zinc alloy powder 62 to 69 wt % (99.9 wt % zinc containing indium), aqueous KOH solution 38 wt % (9 Normal containing about 2 wt % ZnO); CARBOPOL C940 (B.F. Goodrich) gelling agent (about 0.5 wt %). The separator in each case was a conventional cellulosic ion porous separator. The zinc alloy powder within above range does not significantly effect cathode performance. The cells tested were balanced in conventional manner so that the mAmp-hr capacity of $MnO_2$ (based on 370 mAmp-hr per gram $MnO_2$) divided by the mAmp-hr capacity of zinc alloy (based on 822 mAmp-hr per gram zinc alloy) is about 1.

The comparative AA cell contained the conventional solid cathode (formulation A) above referenced containing about 86 wt % MnO2 (EMD) and 7 wt % graphite. This conventional cathode (formulation A) was compacted against the inside surface of the cell casing in conventional manner by applying external force to the mixture to compact it against the cell casing surface. The resulting compacted cathode was a compacted solid material containing about 86 percent by weight $MnO_2$.

Similar AA size cells were prepared but with each having a semisolid cathode corresponding to formulations 1–4 of the invention. The cathode semisolid paste (formulations 1–4) in each case may be injected into an empty cylindrical cell casing using a syringe or forcing it under pressure through an injection nozzle. A cylindrical plunger or the like may then be inserted into the cell and forced against a surface of the paste. A preferred method of loading the cathode paste of the invention into the cell and forcing it against the cell casing surface is described below. The resulting cathode material of the invention (formulations 1–4) pressed against the inside surface of the cell casing is a semisolid having the consistency of a putty or paste.

Figure 3A:
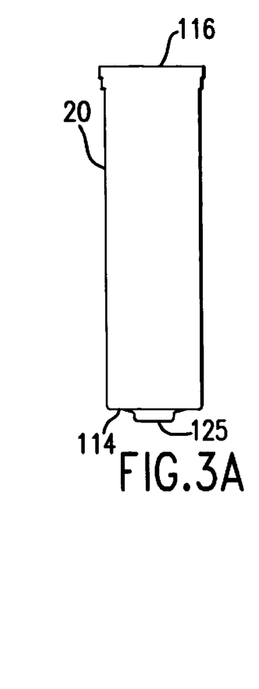
FIG. 3A is a pictorial view of the cell casing.
Figure 3B:
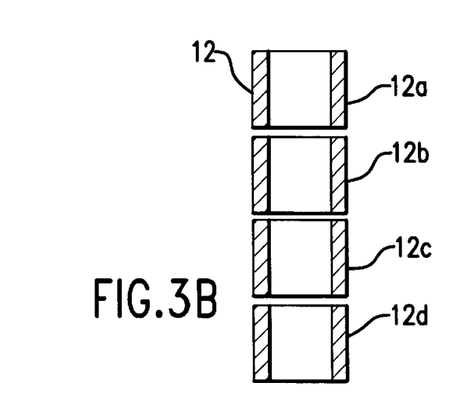
FIG. 3B is a cross sectional view of the cathode material of the invention preformed into disk shaped pellets.

The cathode formulations 5 and 6 result in a moist pasty powder mixture when all of the components are admixed. The formulations 5 and 6 are preferably compressed into disk shaped pellets 12, 12b, 12c and 12d each having a height of about 10 mm (FIG. 3B). As the mixture is compressed into pellets the mixture transforms into a soft putty-like consistency. The pellets are then separately inserted into casing 20 in a stacked arrangement (FIG. 3D). The pellets are inserted so that their outer surface contacts the inside surface of casing 20 (FIG. 3D). After insertion into the casing 20, the pellets may again be slightly recompressed. The pellets, even if recompressed, still retain a putty-like consistency and are soft to the touch. Each pellet 12a–12d can be readily penetrated at a temperature of 20° C. by a 1/16 inch diameter nail at 90° contact angle formed between the central longitudinal axis of the nail and surface of the pellet, without shattering the pellet. The pellets made with formulations 5 and 6 retain their soft putty-like consistency during cell discharge at 1 amp. Alternatively, cathode semisolid formulation 5 and 6 may be injected into casing 20 without preforming the mixture into pellets. As the mix is injected (extruded) under pressure it transforms into a semisolid having a soft putty-like consistency. However, it is preferable to preform semisolid formulations 5 and 6 into pellets before insertion into casing 20 to more readily achieve a uniformity of density of the cathode.

The above described cathode formulations 1–5 retain their semisolid characteristic under normal ambient cell operating conditions.

TABLE 1

DISCHARGE PERFORMANCE[1]

| Cathode Formula | Capacity (mAmp-hr) | Watt-Hrs | Grams $MnO_2$ in Cell | Specific Capacity (mAmp-hr per gram $MnO_2$) | Utilization[2] |
|---|---|---|---|---|---|
| A (solid) | 914 | 0.93 | 9.5 | 96 | (31.2%) |
| 1 (semisolid) | 556 | 0.52 | 3.7 | 151 | (49.0%) |
| 2 (semisolid) | 762 | 0.79 | 3.7 | 195 | (63.3%) |
| 3 (semisolid) | 633 | 0.62 | 4.5 | 138 | (44.8%) |
| 4 (semisolid) | 697 | 0.68 | 4.2 | 166 | (53.9%) |
| 5 (semisolid) | 1380 | 1.45 | 6.6 | 209 | (67.9%) |
| 6 (semisolid) | 990 | 0.93 | 6.4 | 155 | (50.3%) |

Notes:
[1]Discharge at 1 Amp continuous drain to 0.8 Volt cut-off.
[2]Values in parentheses are percent utilization $MnO_2$ (Basis: 100% utilization taken at 308 mAmp-Hr per gram $MnO_2$ based on reduction of $MnO_2$ to MnO(OH).)

As may be seen from Table 1 all of the cells employing the semisolid $MnO_2$ cathode of the invention show increased $MnO_2$ utilization, that is, increase in actual specific capacity of MnO2 for cell discharge at high rate of 1 Amp to 0.8V cutoff. The most significant improvement in MnO2 utilization is obtained employing cathode paste formulations 2, 4, 5, and 6. These formulations have $MnO_2$ content between about 40 and 80 wt %, carbon black or acetylene black between about 5 and 15 wt % and electrolyte (9 Normal KOH) between about 15 and 45 wt %.

As may be seen from Table 1 a preferred formulation 2 provides a $MnO_2$ utilization (mAmp-Hr/g $MnO_2$) which is about twice that obtained with the conventional compacted solid cathode (formulation A). Other preferred formulations 5 and 6 provide MnO2 utilization (mAmp-Hr/g $MnO_2$) respectively about 2.2 and 1.6 times that obtained with the conventional compacted solid cathode (formulation A). The actual total capacity of the AA cell using cathode formulation 2 (762 mAmp-Hr) approaches that of the AA cell employing a conventional cathode formulation A (914 mAmp-Hr) when the cells are discharged at a high rate of 1 Amp to 0.8V cutoff. Also the total energy (0.79 Watt-hrs) output of the AA cell using cathode formulation 2 approaches that of the same cell employing conventional cathode formulation A (0.93 Watt-hrs). The actual total capacity of the AA cell using cathode formulation 5 (1380 mAmp-Hr) exceeds that of the AA cell employing a conventional formulation A (914 mAmp-Hr). Also the total energy (1.45 Watt-hrs) output of the AA cell using cathode formulation 5 exceeds that of the same cell employing conventional cathode formulation A (0.93 Watt-hrs) at the 1 Amp high rate of discharge. An AA cell employing cathode formulation 5 was also discharged at a low constant current drain of 0.1 Amp (100 milliAmp). The actual capacity of the cell at this low current drain (100 milliAmp) was 2250 mAmp-hr which compared favorably with the discharge capacity 2359 mAmp-hr of the same cell using comparative formulation A.

The actual total capacity of the AA cell using cathode formulation 6 (990 mAmp-Hr) exceeds that of the AA cell employing a conventional formulation A (914 mAmp-Hr). Also the total energy (0.93 Watt-hrs) output of the AA cell using cathode formulation 6 is the same as the AA cell employing conventional cathode formulation A (0.93 Watt-hrs).

Such results represent a significant advance in view of the fact that the cell containing cathode formulation 2 contains less than 40% of the actual amount of $MnO_2$ as the conventional (cathode formulation A) cell and the formulations 5 and 6 contain less than 70% of the actual amount of $MnO_2$ as the conventional (cathode formulation A).

Figure 1A:
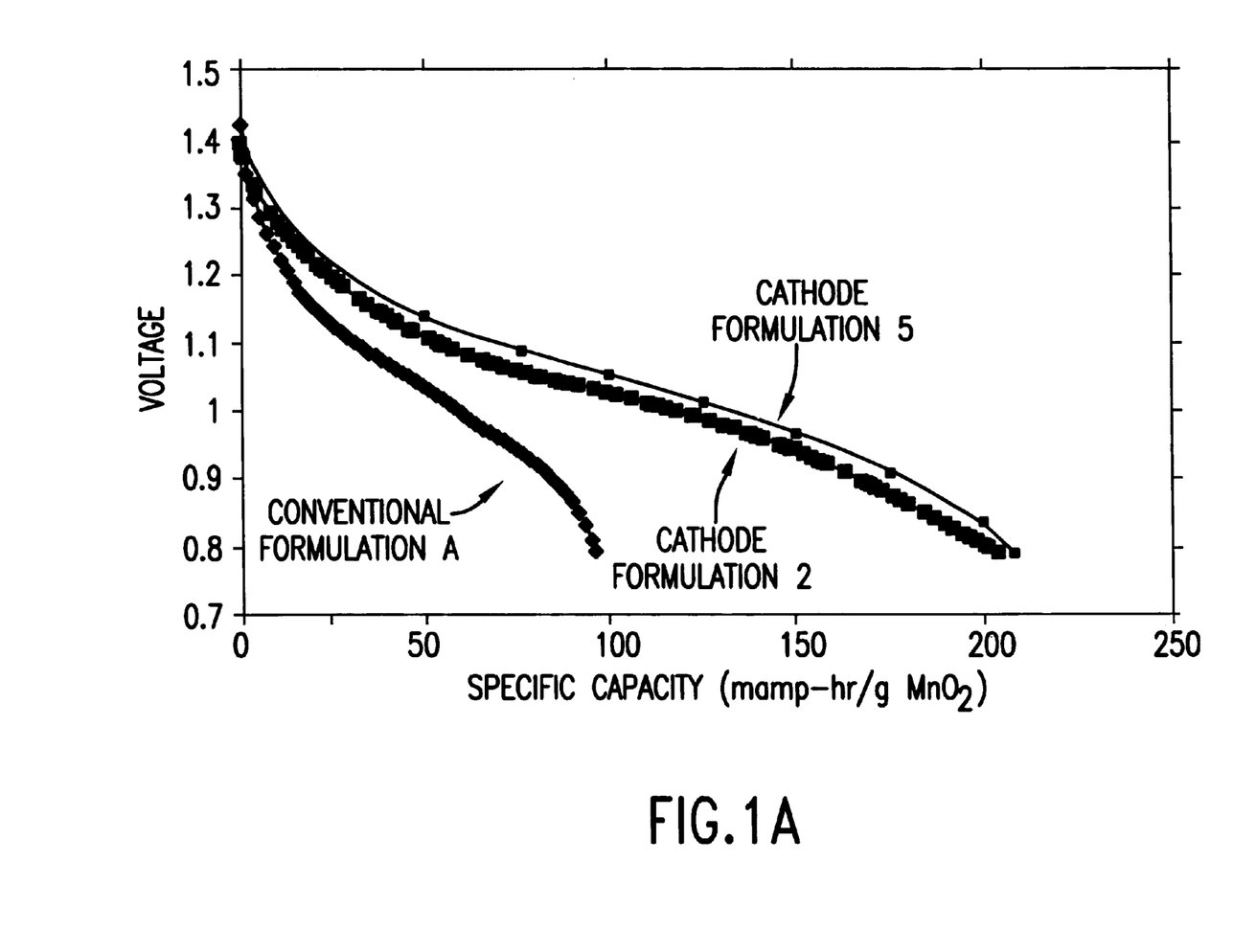
FIG. 1A is a representative $MnO_2$ utilization discharge profile, voltage vs. mAmp-hr per gram $MnO_2$, comparing the cathode of the invention to conventional cathode.

Representative $MnO_2$ utilization discharge profiles are shown in FIG. 1A. The utilization profile (FIG. 1A), voltage vs. mAmp-hr per gram $MnO_2$, compares the discharge profile of the above described cell employing the cathode formulations 2 and 5 of the invention compared to discharge of the same cell employing conventional cathode (formulation A). The discharge profile was generated by discharging each cell at a continuous drain of 1 Amp to a cutoff voltage of 0.8. It is observed that the utilization of the $MnO_2$ is greater at every point along the discharge voltage profile for the cathode of the invention.

Representative Alkaline Cell Employing Cathode of the Invention

A representative alkaline cell configuration employing the cathode material of the invention is shown in FIG. 1. The alkaline cell 10 comprises a cylindrical steel casing 20, having a closed end 114 and an open end 116. The casing 20 is filled with a semisolid cathode 12 of the invention comprising $MnO_2$, and an anode 50 comprising zinc and electrolyte. The electrolyte may comprise a conventional aqueous mixture of KOH, ZnO and gelling agent. The cathode 12 may be supplied by squeezing the semisolid material which may have a putty or paste-like consistency into the cell and applying the material to the inside surface of casing 20. The cathode 12 and anode 50 may be separated by a conventional ion porous cellulosic separator 60. After casing 20 is filled, an insulating plug 160 is inserted into open end 116. The plug 160 is preferably snap fitted around circumferential step 118 as shown in FIG. 1 so that the plug locks in place into the open end 116. Insulating plug 160 may have an integral thin membrane portion 165 therein which is designed to rupture if gas pressure within the cell builds up to exceed a predetermined level.

The peripheral edge 127 of casing 20 is crimped over the top of insulating plug 160. The insulating plug 160 hermetically seals casing 20 so that air cannot enter the cell. An insulating washer 180 is applied over the crimped peripheral edge 127 of casing 20. Insulating washer 180 may be a polyethylene coated paper washer. A terminal end cap 130 is welded to the head of elongated current collector 140. The elongated current collector 140 is then inserted (force fitted) into aperture 144 of insulating plug 160 so that end cap 130 comes to rest against insulating washer 180. Insulating plug 160 may be of polypropylene, talc filled polypropylene, sulfonated polyethylene or nylon. Current collector 140 may be selected from a variety of known electrically conductive metals found to be useful as current collector materials, for example, brass, tin plated brass, bronze, copper or indium plated brass. End cap 130 may be constructed of a conductive metal having good mechanical strength and corrosion resistance such as nickel plated cold rolled steel or stainless steel, preferably, nickel plated low carbon steel. Conventional asphalt sealant may be applied around the current collector 140 before it is inserted into aperture 144. A film label 170 may be applied around casing 20. The terminal end cap 130 becomes the negative terminal of alkaline cell 10 and pip 125 at the closed end of casing 20 becomes the positive terminal.

Method of Loading the Semisolid Cathode

Figure 2A:
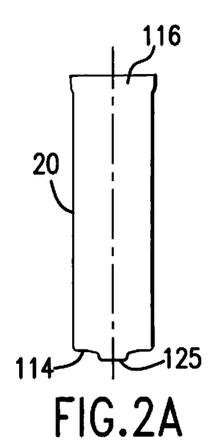
FIG. 2A is pictorial view of a cylindrical cell casing.
Figure 2B:
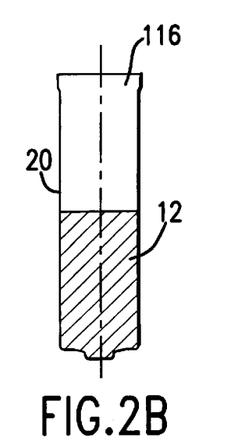
FIG. 2B is a cross sectional view of the cell casing with the cathode material of the invention therein.
Figure 2C:
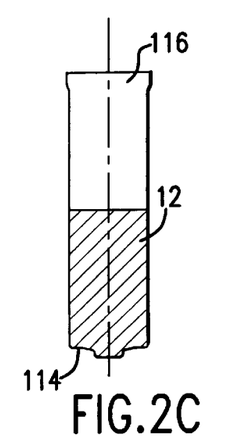
FIG. 2C is a cross sectional view of the cell casing with cathode material just prior to penetration of a mandrel (plunger) into the cathode material.
Figure 2D:
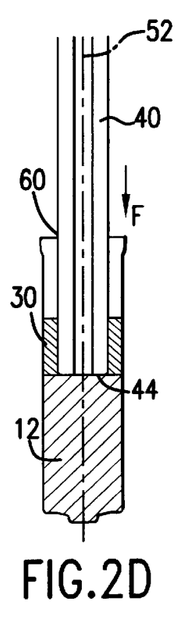
FIG. 2D is a cross sectional view of the cell casing showing the mandrel penetrating the cathode material of the invention.
Figure 2E:
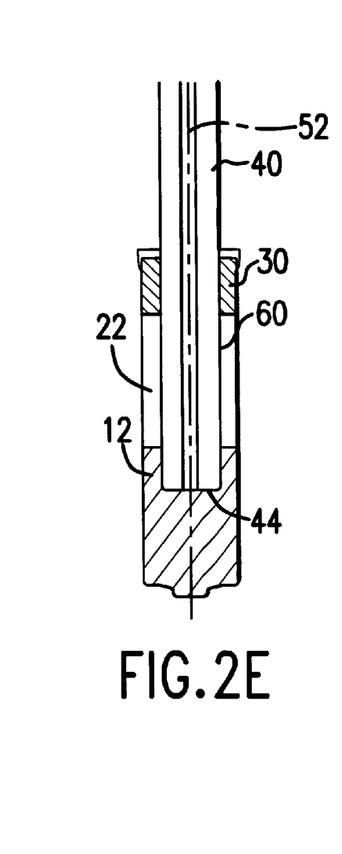
FIG. 2E is a cross sectional view of the cell casing showing the cathode material being forced up into an annular region between the mandrel and the casing.
Figure 2F:
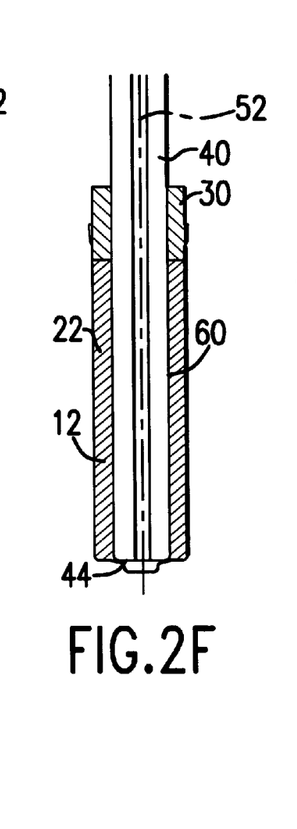
FIG. 2F is a cross sectional view of the cell casing showing a collar sliding up along the length of the mandrel as the mandrel is pushed into the cathode material.

With reference to the enclosed FIGS. 2A–2J a preferred process for loading a semisolid cathode 12 into a cylindrical cell casing 20 having an open end 116 is shown. Cathode 12 is a semisolid typically having the consistency of a putty or paste. Cathode 12 may be first inserted or extruded (injected under pressure) into casing 20 (FIG. 2A) so that it fills a measured portion of the casing volume (FIG. 2B). A separator sheet 60 (ion porous sheet separating cathode from anode) may be wrapped around a cylindrical mandrel (plunger) 40. Mandrel 40, with the separator sheet 60 wrapped thereon (FIG. 2J), may be inserted through a slideable collar 30 which has an outside diameter very slightly smaller than the inside diameter of casing 20. Mandrel 40 may have a hollow longitudinal core 52. Mandrel 40 may be inserted into the open end 116 of casing 20 (FIG. 2C) so that the head 44 of mandrel 40 (and collar 30) comes to rest against the top surface of semisolid cathode paste 12 (FIG. 2D). A downward force F (FIG. 2D) may then be applied to mandrel 40 causing the head 44 of the mandrel to push downward against the surface of cathode paste 12. As the head 44 pushes downward, cathode 12 is gradually forced up along annulus 22 (FIG. 2E) and impacts the inside surface of casing 20. The cathode 12 does not become a solid mass, but rather retains its semisolid characteristic. The upward movement of cathode paste 12 through annulus 22 causes collar 30 to slide up along the outer surface of mandrel 40 until a portion of collar 30 reaches and protrudes from the casing open end 116 (FIG. 2F), while simultaneously head 44 of mandrel 40 reaches the bottom of casing 20. At this point all of the cathode paste 12 originally poured into the casing (FIG. 2B) now fills annulus 22 (FIG. 2F).

Figure 2G:
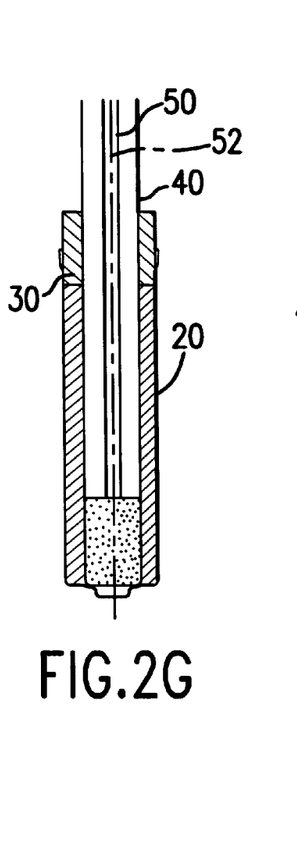
FIG. 2G is a cross sectional view of the cell casing showing an anode slurry being injected into the casing through a central longitudinal aperture within the mandrel.
Figure 2H:
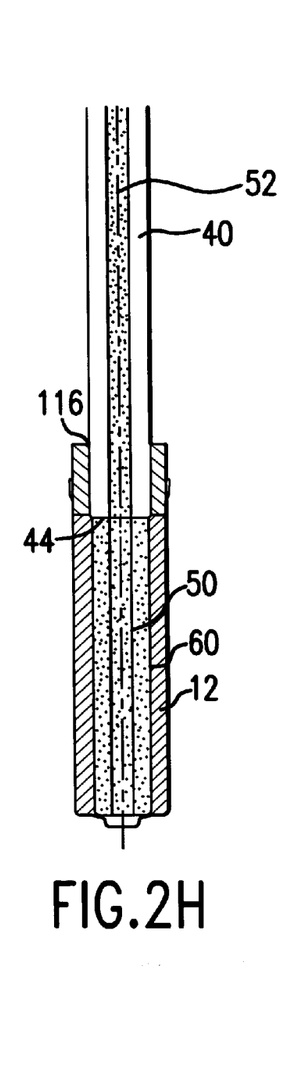
FIG. 2H is a cross sectional view of the cell casing showing an anode slurry filling the central core of the casing.
Figure 2I:
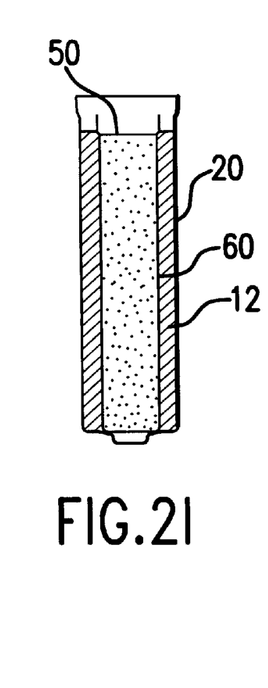
FIG. 2I is a cross sectional view of the cell casing showing the casing filled with anode material and the mandrel removed.
Figure 2J:
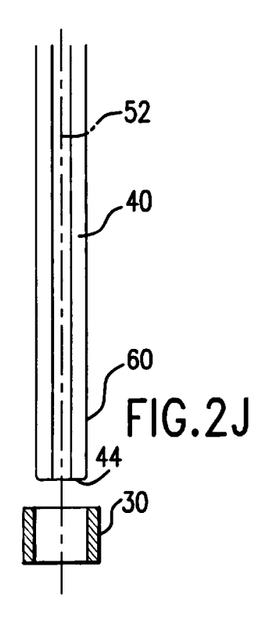
FIG. 2J is a cross sectional view of the mandrel with ion porous separator wrapped around it just prior to penetration into the cathode material of the invention.

Anode slurry material 50 may then be forced under pressure through central core 52 of mandrel 40 thereby causing mandrel 40 to move upward as the level of anode material continues to rise in the cell (FIG. 2G). Finally, as the level of the anode continues to rise, the head 44 of mandrel 40 reaches the open end 116 of the casing and the mandrel may be removed (FIG. 2H). Separator sheet 60 is left behind in the cell to separate the anode material 50 from the cathode material 12 (FIG. 2I). The open end 116 of the casing 20 is then sealed by inserting insulating plug 160, terminal end cap 130 and current collector 140 as above described.

Figure 3C:
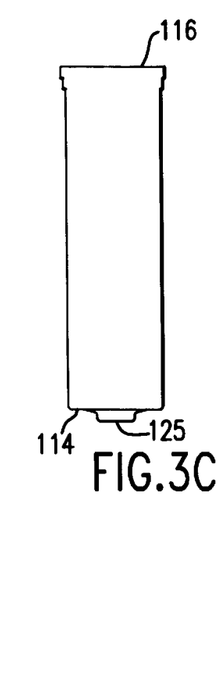
FIG. 3C is a pictorial view of the cell casing ready to receive the cathode pellets.
Figure 3D:
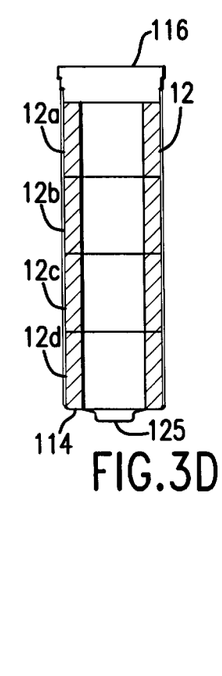
FIG. 3D is a cross sectional view of the cell casing with the disk shaped cathode pellets loaded therein.
Figure 3E:
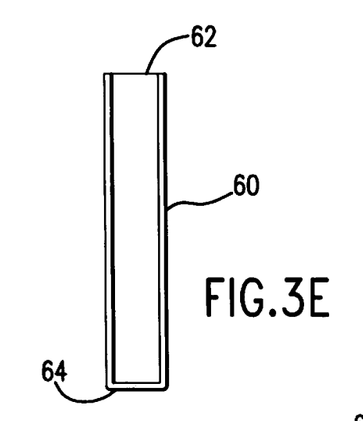
FIG. 3E is a pictorial view of the ion porous separator ready for insertion into the core of the cell casing.
Figure 3F:
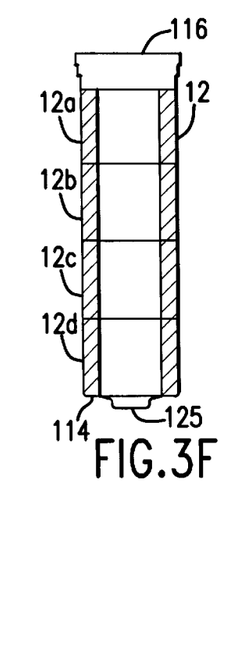
FIG. 3F is a cross sectional view of the cell casing ready for receiving the separator.
Figure 3G:
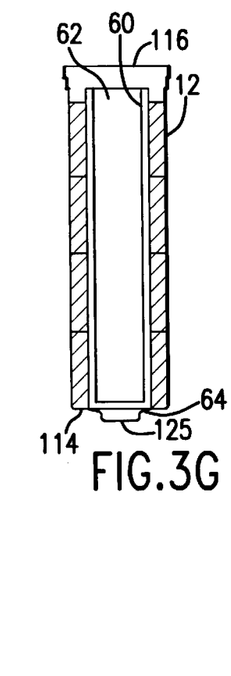
FIG. 3G is a cross sectional view of the cell casing with cathode pellets and separator loaded therein.
Figure 3H:
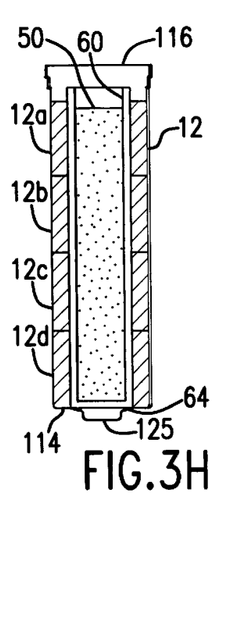
FIG. 3H is a cross sectional view of the cell casing with cathode, separator and anode slurry loaded therein.

Alternatively, the semisolid cathode 12 may be preformed into a plurality of disk shaped pellets 12a–12d as shown in FIG. 3B before insertion into cell casing 20 (FIG. 3C). The pellets may have a height typically of about 10 mm for insertion into a AA size casing. With respect to the above described formulations, the formulations 5 and 6 were preshaped into pellet shaped disk of about 10 mm in height before they were inserted into casing 20. Preforming the semisolid cathode into pellet shaped disks can help to achieve a greater uniformity of density of the cathode. After insertion into casing 20 the pellets may be slightly recompressed, but nevertheless retain their semisolid characteristic even after slight recompression. Thus each pellet 12a–12d may be readily penetrated at a temperature of 20° C. by tapping of a nail (1/16 inch diameter) at a 90° contact angle formed between the central longitudinal axis of the nail and the surface of the pellet, without shattering the pellet. A conventional cylindrically shaped separator 60 having an open end 62 and a closed end 64 may then be inserted into the core of casing 20 so that it lies flush against the inner surface of cathode pellets 12a–12d (FIG. 3G). The core of the casing may then be filled with anode slurry mix 50. The open end 116 of the casing 20 is then sealed by inserting insulating plug 160, terminal end cap 130 and current collector 140 as above described.

Although the present invention was described with respect to specific embodiments, it should be recognized that variations are possible without departing from the concept of the invention. Thus, the invention is not intended to be limited to the specific embodiments, but rather its scope is reflected by the claims and equivalents thereof.

What is claimed is:

1. An alkaline electrochemical cell comprising an anode comprising zinc and a cathode comprising solids comprising manganese dioxide and an aqueous electrolyte solution comprising potassium hydroxide in admixture with said solids, wherein the cathode is a semisolid having a porosity between about 45% and 70%, wherein the volume ratio of electrolyte solution in said cathode to the solids in said cathode is at a value between about 0.7 and 2.3.

2. The alkaline cell of claim 1 wherein the cathode in the cell is a semisolid before discharge of the cell is begun.

3. The alkaline cell of claim 1 wherein the cathode is a semisolid during discharge of the cell to 0.8V.

4. The alkaline cell of claim 1 wherein the semisolid state of the cathode has the effect of increasing the actual specific capacity of the $MnO_2$ when the cell is discharged at an average current drain between 0.5 and 2 Amp.

5. The alkaline cell of claim 1 wherein the semisolid state of the cathode has the effect of increasing the actual specific capacity of the $MnO_2$ when the cell is discharged to 0.8 Volts at an average current drain between 0.5 and 1.5 Amp.

6. The alkaline cell of claim 1 wherein the percent utilization of $MnO_2$ is between about 40 and 70% when the cell is discharged to 0.8 Volts at 1 Amp (calculated at 100% utilization at 308 mAmp-hr/g).

7. The alkaline cell of claim 1 wherein the semisolid cathode has a putty-like consistency so that it is readily penetrated at a temperature of 20° C. by tapping of a nail (1/16 inch diameter) at a 90° contact angle formed between the central longitudinal axis of the nail and the surface of the cathode, without shattering the cathode.

8. The alkaline cell of claim 1 wherein said semisolid cathode has a kinematic viscosity greater than 100 centistokes.

9. The alkaline cell of claim 1 wherein the manganese dioxide comprises between about 40 and 80 percent by weight of the semisolid cathode.

10. The alkaline cell of claim 1 wherein the manganese dioxide comprises between about 45 and 70 percent by weight of the semisolid cathode.

11. The alkaline cell of claim 1 wherein the semisolid cathode comprises between about 5 and 15 percent by weight carbon in the form of carbon black or acetylene black.

12. The alkaline cell of claim 1 wherein the semisolid cathode comprises between about 6 and 18 percent by weight potassium hydroxide (calculated as pure).

13. The alkaline cell of claim 1 wherein the semisolid cathode comprises between about 9 and 27 percent by weight water.

14. The alkaline cell of claim 1 wherein said cell is hermetically sealed.

15. An alkaline electrochemical cell comprising an anode comprising zinc and a cathode comprising solids comprising manganese dioxide and an aqueous electrolyte solution comprising potassium hydroxide in admixture with said solids, wherein the cathode is a semisolid having a porosity between about 45% and 70%, wherein the percent utilization of $MnO_2$ in said cathode is between about 40 and 70% when the cell is discharged continuously at 1 Amp to a cutoff voltage of 0.8 Volts (basis: 100% utilization at 308 mAmp-hr/g), wherein the volume ratio of electrolyte solution to said solids in the cathode is at a value between about 0.7 and 2.3.

16. The alkaline cell of claim 15 wherein the energy density of cell is between about 0.10 and 0.30 Watt-hrs per gram $MnO_2$ when the cell is discharged continuously at 1 Amp to a cutoff voltage of 0.8 Volts.

17. The alkaline cell of claim 15 wherein the cathode is a semisolid comprising between about 40 and 80 percent by weight manganese dioxide.

18. The alkaline cell of claim 15 herein the percent utilization of $MnO_2$ in said cathode is between about 44 and 68% when the cell is discharged to 0.8 Volts at 1 Amp (basis: 100% utilization at 308 mAmp-hr/g).

19. An alkaline electrochemical cell comprising an anode comprising zinc and a cathode comprising solids comprising manganese dioxide and an aqueous electrolyte solution comprising potassium hydroxide in admixture with said solids, wherein the cathode comprises between about 40 and 80 percent by weight manganese dioxide and said cathode has a porosity between about 45 and 70%, wherein the percent utilization of $MnO_2$ in said cathode is between about 40 and 70% when the cell is discharged continuously at 1 Amp to a cutoff voltage of 0.8 Volts (basis: 100% utilization at 308 mAmp-hr/g), wherein the volume ratio of electrolyte solution to the solids in said cathode is at a value between about 0.7 and 2.3.

20. The alkaline cell of claim 19 wherein said cathode is a semisolid.

21. The alkaline cell of claim 19 wherein the cathode comprises between about 6 and 18 percent by weight potassium hydroxide (calculated as pure).

22. The alkaline cell of claim 19 wherein the cathode comprises between about 9 and 27 percent by weight water.

23. The alkaline cell of claim 19 wherein said cell is hermetically sealed.

24. An alkaline electrochemical cell comprising an anode comprising zinc and a cathode comprising solids comprising manganese dioxide and an aqueous electrolyte solution comprising potassium hydroxide in admixture with said solids, wherein said cathode has a porosity between about 45 and 70%, wherein the volume ratio of electrolyte solution in said cathode to total solids in said cathode is between about 0.7 and 2.3, wherein the electrolyte solution has a potassium hydroxide concentration of between about 30 and 51 percent by weight.

25. The alkaline cell of claim 24 wherein said cathode is a semisolid before discharge of the cell is begun.

26. The alkaline cell of claim 24 wherein said cathode is a semisolid during discharge of the cell to 0.8 Volts.

27. The alkaline cell of claim 24 wherein the percent utilization of $MnO_2$ is between about 40 and 70% when the cell is discharged to 0.8 Volts at 1 Amp (calculated at 100% utilization at 308 mAmp-hr/g).

28. The alkaline cell of claim 24 wherein the semisolid cathode has a putty-like consistency so that it is readily penetrated at a temperature of 20° C. by tapping of a nail (1/16 inch diameter) at a 90° contact angle formed between the central longitudinal axis of the nail and the surface of the cathode, without shattering the cathode.

29. The alkaline cell of claim 24 wherein the manganese dioxide comprises between about 40 and 80 percent by weight of the cathode.

30. The alkaline cell of claim 24 wherein said cell is hermetically sealed.

31. An alkaline electrochemical cell comprising an anode comprising zinc and a cathode comprising solids comprising manganese dioxide and an aqueous electrolyte solution comprising potassium hydroxide in admixture with said solids, wherein said cathode has a porosity of between about 45 and 70 percent, wherein the volume ratio of electrolyte solution to the solids in said cathode is at a value between about 0.7 and 2.3, wherein said cathode is a semisolid having a putty-like consistency so that it is readily penetrated at a temperature of 20° C. by tapping of a nail (1/16 inch diameter) at a 90° contact angle formed between the central longitudinal axis of the nail and the surface of the cathode, without shattering the cathode.

32. The alkaline cell of claim 31 wherein said cathode is a semisolid before discharge of the cell is begun.

33. The alkaline cell of claim 31 wherein said cathode is a semisolid during discharge of the cell to 0.8 Volts.

34. The alkaline cell of claim 31 wherein thepercent utilization of $MnO_2$ is between about 40 and 70% when the cell is discharged to 0.8 Volts at 1 Amp (calculated at 100% utilization at 308 mAmp-hr/g).

35. The alkaline cell of claim 31 wherein the manganese dioxide comprises between about 40 and 80 percent by weight of the cathode.

36. The alkaline cell of claim 31 wherein said cell is hermetically sealed.

37. An alkaline electrochemical cell comprising an anode comprising zinc and a cathode comprising solids comprising manganese dioxide and an aqueous electrolyte solution comprising potassium hydroxide in admixture with said solids, wherein said cathode has a porosity between about 45 and 70%, wherein said aqueous electrolyte comprises between about 15 and 45 percent by weight of said cathode and said aqueous electrolyte has a potassium hydroxide concentration of between about 30 and 51 percent by weight, wherein the volume ratio of electrolyte solution to the solids in said cathode is at a value between about 0.7 and 2.3.

38. The alkaline cell of claim 37 wherein said cathode is a semisolid before discharge of the cell is begun.

39. The alkaline cell of claim 37 wherein said cathode is a semisolid during discharge of the cell to 0.8 Volts.

40. The alkaline cell of claim 37 wherein thepercent utilization of $MnO_2$ is between about 40 and 70% when the cell is discharged to 0.8 Volts at 1 Amp (calculated at 100% utilization at 308 MAmp-hr/g).

41. The alkaline cell of claim 38 wherein the semisolid cathode has a putty-like consistency so that it is readily penetrated at a temperature of 20° C. by tapping of a nail (1/16 inch diameter) at a 90° contact angle formed between the central longitudinal axis of the nail and the surface of the cathode, without shattering the cathode.

42. The alkaline cell of claim 38 wherein said cell is hermetically sealed.

43. An alkaline electrochemical cell comprising an anode comprising zinc and a semisolid cathode comprising solids comprising manganese dioxide and an aqueous electrolyte solution comprising potassium hydroxide in admixture with said solids, wherein said cathode has a porosity between about 45 and 70%, wherein said semisolid cathode comprises between about 40 and 80 percent by weight manganese dioxide, wherein the volume ratio of electrolyte solution to the solids in said cathode is between about 0.7 and 2.3.

44. The alkaline cell of claim 43, wherein thepercent utilization of $MnO_2$ in said cathode is between about 40 and 70% when the cell is discharged continuously at 1 Amp to a cutoff voltage of 0.8 Volts (basis: 100% utilization at 308 mAmp-hr/g).

45. The alkaline cell of claim 43, wherein the percent utilization of $MnO_2$ in said cathode is between about 40 and 70% when the cell is discharged continuously at 1 Amp to a cutoff voltage of 0.8 Volts (basis: 100% utilization at 308 mAmp-hr/g).

46. The alkaline cell of claim 43 wherein the cathode comprises between about 6 and 18 percent by weight potassium hydroxide (calculated as pure).

47. The alkaline cell of claim 43 wherein the cathode comprises between about 9 and 27 percent by weight water.

48. The alklaine cell of claim 43 wherein the semisolid cathode has a putty-like consistency so that it is readily penetrated at a temperature of 20° C. by tapping of a nail (1/16 inch diameter) at a 90° contact angle formed between the central longitudinal axis of the nail and the surface of the cathode, without shattering the cathode.

49. The alkaline cell of claim 43 wherein the manganese dioxide comprises between about 45 and 70 percent by weight of said semisolid cathode.

50. The alkaline cell of claim 43 wherein said cell is hermetically sealed.

51. A method of loading a cathode mixture into a cylindrical casing for an alkaline cell, said casing having an open end and a closed end, the method comprising the steps of forming a cathode mixture comprising solids comprising manganese dioxide and an aqueous electrolyte solution comprising potassium hydroxide in admixture with said solids, inserting said cathode mixture into the open end of said casing so that a portion of the cathode mixture contacts the inside surface of said casing, wherein said cathode mixture in said casing is in a semisolid state and has a porosity between about 45 and 70%, wherein the volume ratio of electrolyte solution to the solids in said cathode mixture is at a value between about 0.7 and 2.3.

52. The method of claim 51 wherein the cathode mixture is injected under pressure into the open end of the cell casing.

53. The method of claim 51 wherein said method comprises the step of applying external pressure to said cathode mixture in said casing to impact said cathode mixture against the inside surface of said casing, without changing the semisolid condition of said cathode mixture.

54. The method of claim 51 wherein the semisolid cathode has a putty-like consistency so that it is readily penetrated at a temperature of 20° C. by tapping of a nail (1/16 inch diameter) at a 90° contact angle formed between the central longitudinal axis of the nail and the surface of the cathode, without shattering the cathode.

55. The method of claim 51 wherein the manganese dioxide comprises between about 40 and 80 percent by weight of the semisolid cathode.

56. The method of claim 51 wherein the manganese dioxide comprises between about 45 and 70 percent by weight of the semisolid cathode.

57. The method of claim 51 wherein the semisolid cathode comprises between about 5 and 15 percent by weight carbon in the form of carbon black or acetylene black.

58. The method of claim 51 wherein the semisolid cathode comprises between about 6 and 18 percent by weight potassium hydroxide (calculated as pure).

59. The method of claim 51 wherein the semisolid cathode comprises between about 9 and 27 percent by weight water.

60. The method of claim 51 wherein the cathode comprises aqueous electrolyte comprising potassium hydroxide, wherein the aqueous electrolyte comprises between about 15 and 45 percent by weight of said cathode and said aqueous electrolyte has a potassium hydroxide concentration of between about 30 and 51 percent by weight.

61. The method of claim 51 wherein the cathode mixture is inserted into the casing in the form of a plurality of disk shaped pellets in semisolid state, wherein a portion of the pellets contact the inside surface of the casing, said method further comprising the step of compressing said disk shaped pellets in said casing without changing the semisolid condition of said pellets.

62. The method of claim 51 further comprising the step of hermetically sealing the open end of said casing to prevent air from entering said casing.

* * * * *